US012809835B2

(12) United States Patent
England et al.

(10) Patent No.: US 12,809,835 B2
(45) Date of Patent: Nov. 24, 2026

(54) SYSTEMS AND METHODS FOR DATABASE QUALITY RECURRENCE CHECKS AND INSIGHTS

(71) Applicant: Veeva Systems Inc., Pleasanton, CA (US)

(72) Inventors: Patricia Avril England, Pleasanton, CA (US); Manaphan Huntrakoon, Phoenix, AZ (US); Jonathan Chickneas, Lafayette, CA (US); Jonathan Stone, Olympia, WA (US); Katherine Noel Cohen, Santa Barbara, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/412,816

(22) Filed: Dec. 8, 2025

(65) Prior Publication Data

US 2026/0161620 A1 Jun. 11, 2026

Related U.S. Application Data

(60) Provisional application No. 63/729,200, filed on Dec. 6, 2024.

(51) Int. Cl.

| | |
|---|---|
| ***G06F 16/20*** | (2019.01) |
| ***G06F 16/215*** | (2019.01) |
| *G06F 16/2457* | (2019.01) |
| *G06F 16/903* | (2019.01) |

(52) U.S. Cl.

CPC ...... *G06F 16/215* (2019.01); *G06F 16/24578* (2019.01); *G06F 16/90344* (2019.01)

(58) Field of Classification Search

CPC ............. G06F 16/215; G06F 16/24578; G06F 16/90344

See application file for complete search history.

(56) References Cited

U.S. PATENT DOCUMENTS

2017/0315979 A1* 11/2017 Boucher ............... G06F 3/0482
2022/0345543 A1* 10/2022 Oleinikov ........ G06Q 10/06393
2023/0055241 A1* 2/2023 Zionpour .............. G06F 40/186
2025/0156941 A1* 5/2025 Schoifet ................. G06Q 40/02

* cited by examiner

*Primary Examiner* — Diedra McQuitery

(57) ABSTRACT

A computer-implemented method for quality recurrence check in database management systems. A quality data object record is identified. The database management system establishes a set of match criteria including a temporal constraint, matching field limiter, and text comparison fields restriction. A set of suggested match terms is extracted from a first field in the quality data object record that outline aspects of the quality data object record to be matched. The set of suggested match terms with data object records in the database management system satisfying the set of match criteria are compared to identify potential recurrence data objects associated with the quality data object record. Each identified potential recurrence data object satisfying a threshold is associated with the quality data object. Similarly, the inverse association is executed. The quality data object is associated with each identified potential recurrence data object satisfying the threshold.

18 Claims, 15 Drawing Sheets

600

1200

SYSTEMS AND METHODS FOR DATABASE QUALITY RECURRENCE CHECKS AND INSIGHTS

CROSS REFERENCE TO RELATED APPLICATIONS

This application claims priority to U.S. Provisional Parent Application No. 63/729,200 filed Dec. 6, 2024, titled "Systems and Methods for Database Quality Recurrence Checks and Insights", which is incorporated herein by reference in its entirety.

TECHNICAL FIELD

The present disclosure relates generally to database management, and more particularly to improving quality data recurrence in a database using unstructured data.

BACKGROUND

Corrective and preventive action systems provide structured, systematic frameworks for organizations to identify, investigate, and address issues in processes, products, or systems in order to improve overall quality. There is an acute and unmet need for a data management system that employs advanced computational methods to perform more effective, systemic and contextually consistent recurrence checks, thereby ensuring robust quality and compliance.

SUMMARY OF THE INVENTION

Embodiments disclosed in the present document provide systems and machine-implemented methods for database quality recurrence checks and insights. The computer-implemented method comprises: identifying, by the database management system, a quality data object record; establishing, by the database management system, a set of match criteria including a temporal constraint, matching field limiter, and text comparison fields restriction; extracting a set of suggested match terms from a first field in the quality data object record that outline aspects of the quality data object record to be matched; comparing the set of suggested match terms with data object records in the database management system satisfying the set of match criteria to identify potential recurrence data objects associated with the quality data object record; generating a match score for each data object record and quality data object record comparison; evaluating a bracket ranking for each match score to identify the likelihood of match corresponding to each of the identified potential recurrence data objects; associating each identified potential recurrence data object with the quality data object record with a match score above a first threshold; and inversely associating the quality data object record with each identified potential recurrence data object with a match score above the first threshold.

BRIEF DESCRIPTION OF THE DRAWINGS

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

Figure 1A:
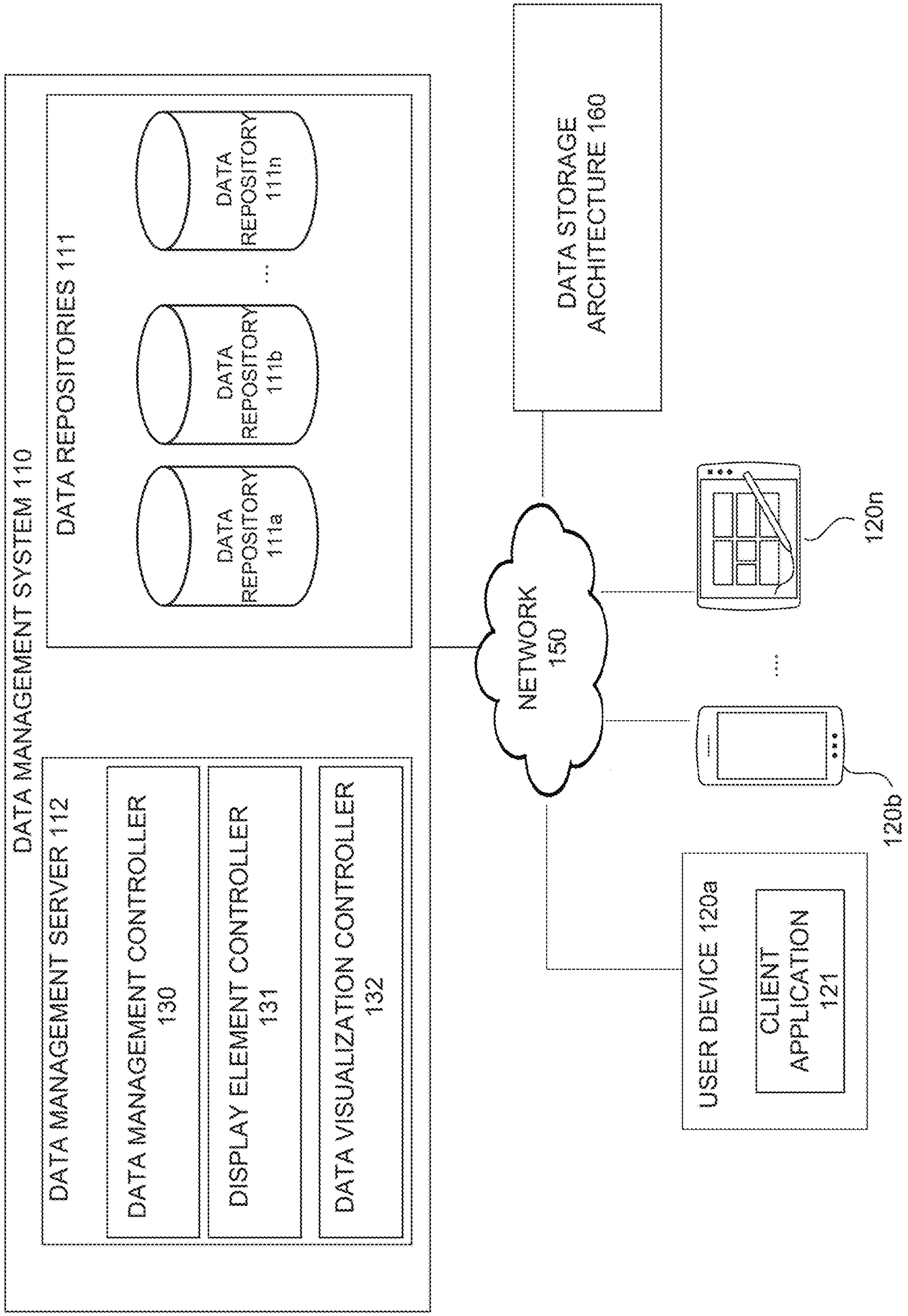
FIG. 1A illustrates an example high level block diagram of a database system architecture wherein the present invention may be implemented.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a", "an", and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated list items.

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

As described herein, "health information" can include information related to a patient's medical history such as diagnosis information (e.g., an ICD-10 diagnosis code), procedures (e.g. a HCPCS procedure code), medical claims (Mx) information, clinical information, electronic health record information, national health insurance (e.g., Medicare or Medicaid) claims information, facility or health care system location information, and medical outcomes as well as prescription claims (Rx) information associated with one or more medical products (e.g., including transaction information, prescribing HCP national prescriber identifier (NPI), medical product information, date/time information, diagnosis information, and the like). Further, "health information" can further include protected health information (PHI) such as a patient's name, address, IP address, contact information, and the like and longitudinal health information. In this regard, "longitudinal health information" can include health information for a specific HCP or patient over a period of time. For example, "longitudinal health information" may include a group or set of Rx information for one patient over 10 years. In another example, "longitudinal health information" may include a group of Rx information for one HCP over a period of 10 years.

As described herein, "health care professional (HCP) information" can include information related to an HCP such as an NPI of the HCP, a name of the HCP, an address of the HCP, a specialty of the HCP (e.g., Cardiology), a place of employment of the HCP (e.g., Johns Hopkin's hospital, X Medical Group, etc.), a type, degree, or certification held by the HCP (e.g., Doctor of Medicine, Registered Nurse, Nurse Practitioner, etc.), and other information described herein as being associated or related to an HCP.

Corrective and preventive action systems provide structured, systematic frameworks for organizations to identify, investigate, and address issues in processes, products, or systems in order to improve overall quality and compliance. In industries like pharmaceuticals, medical devices and other life sciences industries, regulatory compliance and maintaining high-quality standards are critical. Corrective actions are a reactive measure implemented to eliminate the root cause of an existing, identified non-conformity or undesirable situation. The process implements measures to correct the immediate issue and prevent it from recurring, while also tracking the effectiveness of the corrective action over time. Preventive actions is a proactive measure implemented to eliminate the root cause of a potential nonconformity or undesirable situation that has not yet occurred. The process determines potential risks or weak points that could lead to future issues and implements measures to prevent future problems before they happen.

Currently, the process of performing effective recurrence checks remains a complex, resource-intensive, and inherently manual effort. Quality personnel typically rely on general database search functions to query historical records (e.g., non-conformance reports, deviation logs, audit findings) for related issues. This approach introduces significant variability and inconsistency because the search results are heavily dependent upon the user's input. Variables such as keyword dependency, lack of semantic context, data overload and interpretation risk could result in compliance issues because an organization may not be able to identify potential problems and ensure they have appropriate corrective and preventative actions put in place. There is an acute and unmet need for a data management system that employs advanced computational methods to perform more effective, systemic and contextually consistent recurrence checks, thereby ensuring robust quality and compliance.

FIG. 1A illustrates an example high level block diagram of a database management system architecture 100 wherein the present invention may be implemented. As shown, the architecture 100 may include a data management system 110, a plurality of user computing devices 120*a*, 120*b*, . . . 120*n*, and a data storage architecture 160 coupled to each other via a network 150. The data management system 110 may include data repositories 111 and a data management server 112. The data repositories 111 may have two or more data repositories, e.g., 111*a*, 111*b*, . . . and 111*n*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access data in the database management system 110 via the network 150. User computing devices 120*a*-120*n* are illustrated in more detail in FIG. 4.

The data repositories 111 may store data that client applications (e.g., 121) in user computing devices 120*a*-120*n* may access and may be any commercially available storage devices.

The data management server 112 is typically a remote computer system accessible over a remote or local network, such as the network 150. The data management server 112 could be any commercially available computing devices. A client application (e.g., 121) process may be active on one or more user computing devices 120*a*-120*n*. The corresponding server process may be active on the data management server 112. The client application process and the corresponding server process may communicate with each other over the network 150, thus providing distributed functionality and allowing multiple client applications to take advantage of the information-gathering capabilities of the content management system 110.

The data management system 100 may have a data management controller 130 for data duplication management, display element controller 131, and data visualization controller 132.

The data storage architecture 160 may be, e.g., a data warehouse, and may be operated by a third party.

In one implementation, the data management system 110 may be a multi-tenant system where various elements of hardware and software may be shared by one or more customers. For instance, a server may simultaneously process requests from a plurality of customers, and the data repositories 111 may store data for a plurality of customers. In a multi-tenant system, a user is typically associated with a particular customer. In one example, a user could be an employee of one of a number of pharmaceutical companies which are tenants, or customers, of the data management system 110.

In one embodiment, the data management system 110 may run on a cloud computing platform. Users can access content on the cloud independently by using a virtual machine image, or purchasing access to a service maintained by a cloud database provider.

In one embodiment, the data management system 110 may be provided as Software as a Service ("SaaS") to allow users to access the content management system 110 with a thin client.

The present invention allows users to configure what to display on a custom report and how to arrange and display the content (e.g., size, color, theme, form, duration) on the custom report, so that they can visualize the data the way they want. A data visualization interface may be used to generate the custom report, and may have code in a markup language for describing and defining the content of the custom report. One example of the markup language is HyperText Markup Language ("HTML"), and the HTML code may specify the data to be displayed and their location on the custom report according to user configuration. The data visualization interface may also have code in a programming language for describing the custom report's functionality, which may be, e.g., JavaScript code for specifying the objects and fields users want to query to obtain the data to fill up the custom report. The data is returned to the data visualization interface in JSON format. The JavaScript code may place the data, additional data insight, or custom display element at the right place on the custom report, using the HTML to display the custom report.

Users may modify the objects and fields they like to query using the data visualization interface. The data visualization controller 132 modifies the JavaScript accordingly. The data visualization interface could be a webpage, iFrame, or Webview. The data visualization controller 132 may also manipulate the objects and fields by performing calculations to generate a new data element. Various data elements may be selected and translated into a display element in the custom report. The data visualization interface may also have code in a programming language for describing the form of the display element.

The present invention provides an application programming interface ("API") which may communicate with the JavaScript in the data visualization interface and then query data and objects in the data storage architecture 160, data repository 111*a*, . . . , or data repository 111*n* to get a result set.

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms. The data visualization controller 132 of the present invention may be integrated as a portion of the various platform web applications, and live as a child application within these parent applications. In order to make convenient use of the data, or data from one or more external data storages, whether it is available through network calls or locally within the parent application, the data access library may expose an API for interacting with the data.

In one implementation, the API may be a unified API which may query various types of data sources across multiple platforms, e.g., iOS, Windows, and the browser for Salesforce online. What a user frequently queries (e.g., the last five calls, most recent calls or all calls submitted) may be packaged up in well formed API calls. The JavaScript may communicate with the API only, and does not have to care about the type of the actual database to be queried. Multiple APIs from multiple providers, utilizing different API styles (e.g., REST, GraphQL, SOAP, RPC, etc.), may send payloads in various data formats (JSON, XLM, etc.) and use different data models. Meeting each providers integration requirements can be made in order to facilitate reliable connections with multiple providers.

Figure 1B:
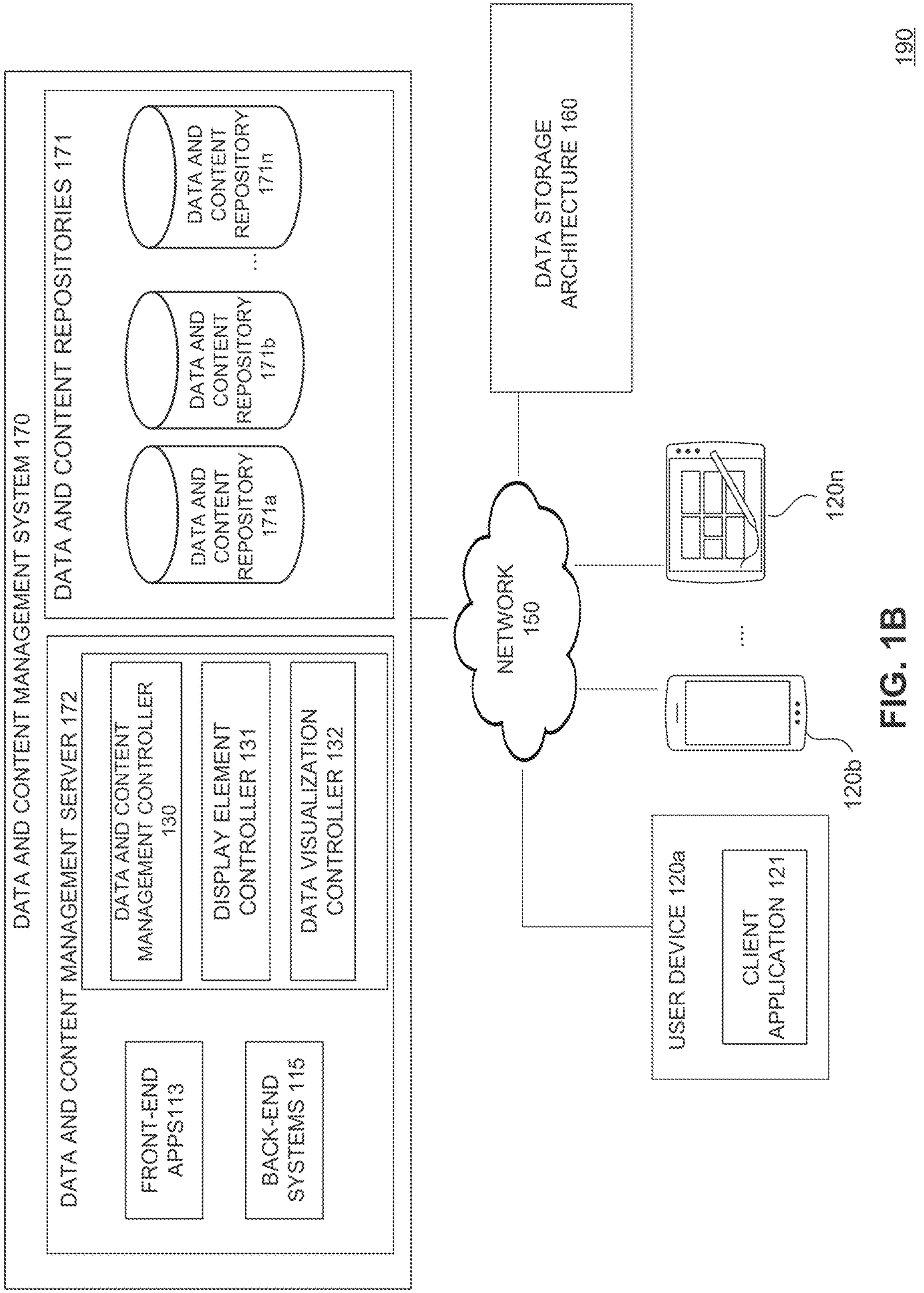
FIG. 1B illustrates an example high level block diagram of an enterprise content management architecture wherein the present invention may be implemented.

FIG. 1B illustrates an example high level block diagram of an enterprise data and content management architecture 190 wherein the present invention may be implemented. The enterprise may be a business, or an organization. As shown, the architecture 190 may include a data and content management system 170, a plurality of user computing devices 120*a*, 120*b*, . . . 120*n*, and a data storage architecture 160 coupled to each other via a network 150. The data and content management system 170 may include a data and content repositories 171 and a data and content management server 172. The data and content repositories 171 may have two or more data and content repositories, e.g., 171*a*, 171*b*, . . . and 171*n*.

The data and content repositories 171 may store data and content that client applications (e.g., 121) in user computing devices 120*a*-120*n* may access and may be any commercially available storage devices. As will be described with reference to FIG. 2 below, each data and content repository (e.g., 171*a*, 171*b* or 171*n*) may store a specific category of content, be the source repository for its content, and allow users to interact with its content in a specific business context.

In one implementation, the data and content repositories 171 may store medical data that client applications (e.g., 121) in user computing devices 120*a*-120*n* may access and may be any commercially available storage devices. Each data and content repository (e.g., 171*a*, 171*b* or 171*n*) may store a specific category of data, and allow users to interact with its data in a specific business context. It should be appreciated that content repositories may be separate logic sections in a same storage device.

The data and content management server 172 is typically a remote computer system accessible over a remote or local network, such as the network 150. The data and content management server 172 could be any commercially available computing devices. A client application (e.g., 121) process may be active on one or more user computing devices 120*a*-120*n*. The corresponding server process may be active on the data and content management server 172, as one of the front-end applications 113 described with reference to FIG. 2. The client application process and the corresponding server process may communicate with each other over the network 150, thus providing distributed functionality and allowing multiple client applications to take advantage of the information-gathering capabilities of the data and content management system 190.

In one implementation, the architecture 170 may be used for generating, aggregating and managing medical data, e.g., clinical trial data. A first data and content repository (e.g., 171*a*) may be used by a first sponsor (e.g., a pharmaceutical company) to store a first study design received from a first computing device (e.g., 120*a*). The first study design may define the infrastructure and lifecycle of the study, and may comprise rules (e.g., for queries, derived values, notifications and displaying events, forms and items), a casebook (i.e., a doctor's binder), event groups, events (e.g., patients visits), forms which comprise segregated sections and fields, item groups and items. In one example, a study design may define a particular study, i.e., each patient may have ten visits, and each visit may have three forms. There may be a workflow associated with each visit, e.g., what needs to be done at each visit.

In one implementation, the first study design may be stored as definition objects in the first data and content repository 171*a*, specifying what is required to happen on each site during the study. The first data and content repository 171*a* may also store electronic records of the first study. In one implementation, the electronic records may be EDC data. Patient clinical trial source data may be captured at the user computing devices, and the aggregated and obfuscated data may be stored as EDC data in the first data and content repository 171*a*.

The second data and content repository 171*b* may be used by a first site (e.g., a hospital) of the first study to store clinical trial source data from a second user computing device (e.g., 120*b*), and a third data and content repository (e.g., 171*c*) may be used by a second site of the first study to store clinical trial source data from a third user computing device (e.g., 120*c*). The clinical trial source data (e.g., three blood pressure values of a patient taken during one visit) in the second data and content repository 171*b* may be converted to EDC data (e.g., the average of the three blood pressure values) automatically, and then stored in the first data and content repository 171*a* as EDC data. Similarly, the clinical trial source data in the third data and content repository 171*c* may be converted to EDC data automatically, and then stored in the first data and content repository 171*a* as EDC data. In one implementation, the clinical trial source data may be converted to the EDC data at the client application 121, and the EDC data is transmitted to the data and content management server 172. In one implementation, the clinical trial source data may be transmitted to the data and content repository 171*b* or 171*c* via the data and content management server 172, and converted to the EDC data at the data and content management server 172. The EDC data is then stored in the data and content repository 171*a*. Data in the second data and content repository 171*b* and the third data and content repository 171*c* may be synchronized with that in the first data and content repository 171*a* regularly or from time to time when new data entries are received from user computing devices. The first study design may be transmitted to the second data and content repository 171*b* and the third data and content repository 171*c*. The second repository and the third repository may be synchronized with the first repository for updates to the first study design.

In another implementation, data and content management server 172 may control the collection of the medical data, and also the operations and management of the clinical trial, including jobs or assignments to facilitate the real-time visibility and execution of the clinical trial. For instance, the clinical trial source data may be converted to the EDC data at the client application 121, and the EDC data is transmitted to data and content management server 172. In one implementation, the clinical trial source data may be transmitted to the data and content repository 171*b* or 171*c* via the data and content management server 172, and converted to the EDC data at the data management server 172. The data management server 172 may receive the EDC data and then manage reimbursements to research sites and tracks the study budgets based on the received EDC data. The data and content management server 172 may also provide study management and monitoring capabilities. The data and content management server 172 may generate dashboards and reports tracking key indicators including enrollment and milestones based on the EDC data received from the data and content management server 172.

In another implementation, a first data and content repository (e.g., 171*a*) may be used by a sponsor (e.g., a pharmaceutical company) using a first computing device (e.g., 120*a*) to store EDC data received from a site (e.g., local lab) using a second computing device (e.g., 120*b*). The EDC data input by the second computing device may contain questionable content requiring verification. Queries may be created by the first computing device and managed by the data and content management server 172. The site (e.g., a local lab) may use the first data and content repository (e.g. 171*a*) from a second user computing device (e.g., 120*b*) to answer the queries managed by the data and content management server 172. Upon satisfactory response, the query can be closed by the data and content management server 172. Alternatively, the first computing device (e.g., 120*a*) may create a subsequent query to be managed by the data and content management server 172.

The data and content management system 170 may have a data duplication controller 130 for data access management.

The data storage architecture 160 may be, e.g., a data warehouse, and may be operated by a third party.

Although the front-end applications 113, back-end systems 115, the data access controller 130 are shown in one server, it should be understood that they may be implemented in multiple computing devices.

In one implementation, the data and content management system 170 may be a multi-tenant system where various elements of hardware and software may be shared by one or more customers. For instance, a server may simultaneously process requests from a plurality of customers, and the data and content repositories 171 may store content for a plurality of customers. In a multi-tenant system, a user is typically associated with a particular customer. In one example, a user could be an employee of one of a number of pharmaceutical companies which are tenants, or customers, of the data and content management system 170.

In one embodiment, the data and content management system 170 may run on a cloud computing platform. Users can access content on the cloud independently by using a virtual machine image, or purchasing access to a service maintained by a cloud database provider.

In one embodiment, the data and content management system 170 may be provided as Software as a Service ("SaaS") to allow users to access the content management system 110 with a thin client.

Figure 2:
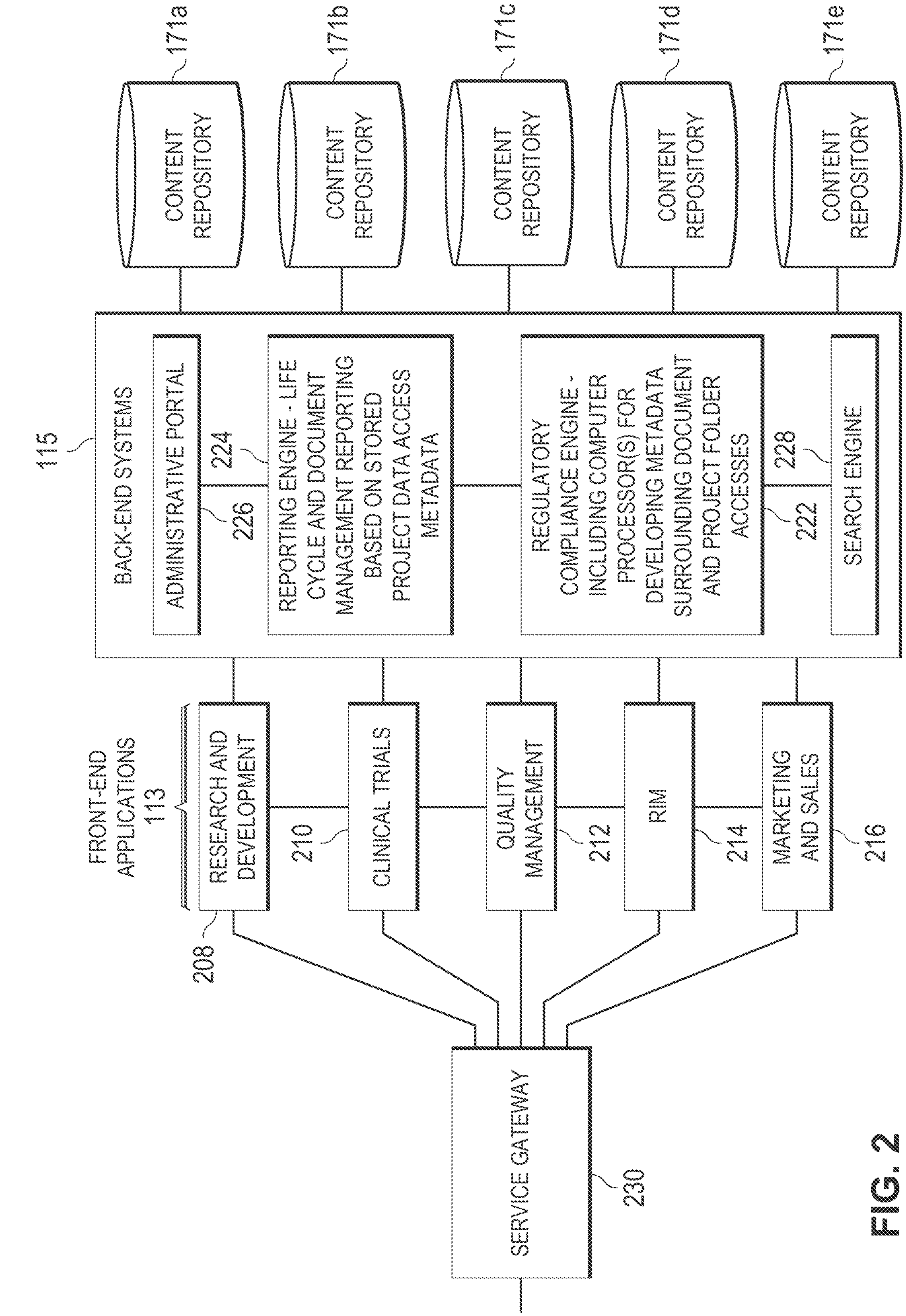
FIG. 2 provides a description of the content management system with additional specific applications and interfaces connected thereto.

FIG. 2 provides a description of the data and content management system 170 with additional specific applications and interfaces connected thereto. In an embodiment, this data and content management system 170 is a cloud-based or distributed network based system for consolidating an enterprise's data, oftentimes integrating multiple content repositories in an enterprise into a single system having coordinated control, measuring, and auditing of data creation, access and distribution.

In an embodiment of the data and content management system 170 for the life sciences industry, as illustrated in the figure, this data and content management system 170 can include specific data collections for the following areas and/or business process-specific front-end applications 113:

A Research & Development (R&D) front-end application 208 provides for an aggregation of materials in support of research and initial clinical trial submissions through building organized and controlled content repositories within the data and content management system 170, more specifically, the content repository 171*a*. Elements that can be stored, organized, and managed through this front-end include submission bills of materials, Drug Information Association (DIA) reference models support, and submission-ready renderings. This front-end 208 is designed to provide an interface to the data and content management system 170 whereby researchers, contract research organizations (CROs), and other collaboration partners can access and/or distribute content through a single controlled document system.

A clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the data and content management system 170 further provides for efficient passing off of content, e.g., in the content repository 171*b*, between this phase and other phases of the life sciences development process.

A manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the data and content management system 170, or more specifically, the content repository 171*c*, whereby it can be assured that the related documents are not distributed in contravention of law and company policy. The application 212 also manages business processes including change control, complaints, corrective actions and preventive actions ("CAPA"), deviation and audits.

A regulatory information management ("RIM") application 214 provides for management of regulatory information, submission processes and submission reports, which may include, e.g., safety reporting, product registrations, health authority interactions, central and local requirements, submissions to health authorities, and health authority information management. The product registration information may include, e.g., the associated product information, application information, application date, registration details, key registration dates, marketing status, and marketing details. The health authority interactions may include bidirectional interactions with health authorities globally, including correspondences, commitments and queries. Pharmaceutical companies may submit registration applications to health authorities to get approval for selling products in a country. The registration process may take a few months and status of the registration may change over time. User may see global registrations and their status in one or more submission reports. Related documents may be stored in the content repository 171*d*.

A marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the data and content management system 170, and the promotional materials may be stored in the content repository 171*e*.

The data and content management system 170 may have a number of back-end system applications 115 that provide for the management of the data, forms, and other communications in. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

The back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the data and content management system 170.

The back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

The back-end systems 115 may include a search engine 228 whereby the data and content management system 170 can deliver simple, relevant and secure searching.

The data and content management system 170 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, updates in one repository, e.g., the content repository 171*c* for the quality management application front-end application 212, may be shared with a repository (e.g., the RIM repository 171*d*) for another front-end application (e.g., the RIM application 214).

The data and content management system 170 may store content for other industries.

Figure 3:
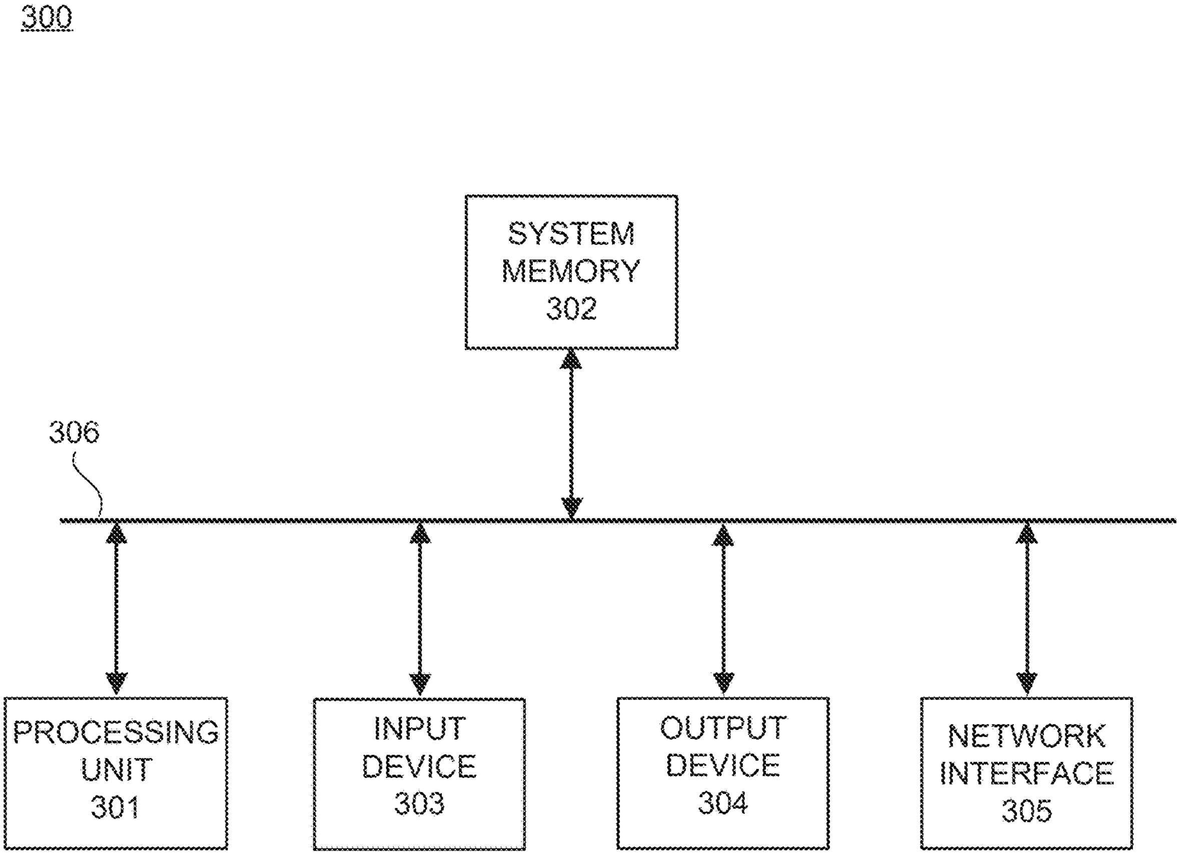
FIG. 3 illustrates an example block diagram of a computing device.

FIG. 3 illustrates an example block diagram of a computing device 300 which can be used as the user computing devices 120*a*-120*n*, and the data management server 112 and data and content management server 172 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
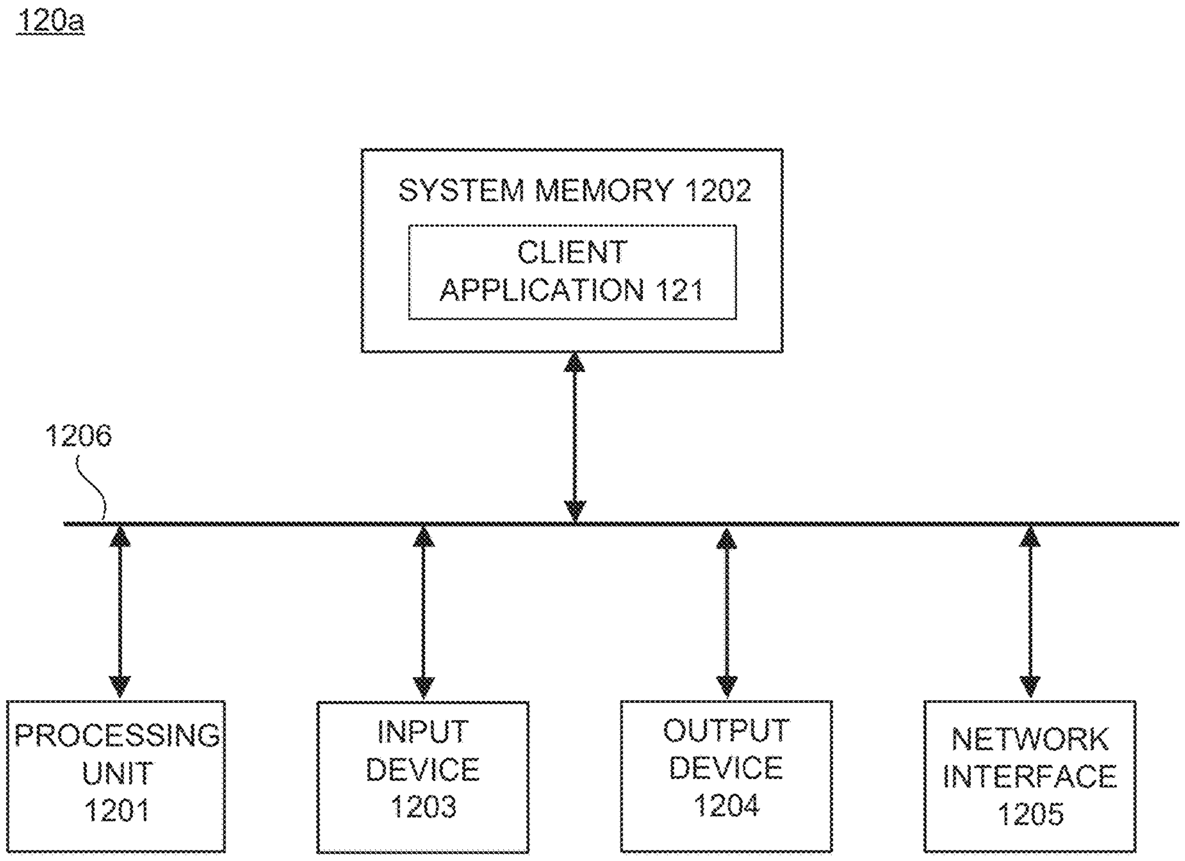
FIG. 4 illustrates an example high level block diagram of a user computing device.

FIG. 4 illustrates an example high level block diagram of a user computing device (e.g., 120*a*) wherein the present invention may be implemented. The user computing device 120*a* may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
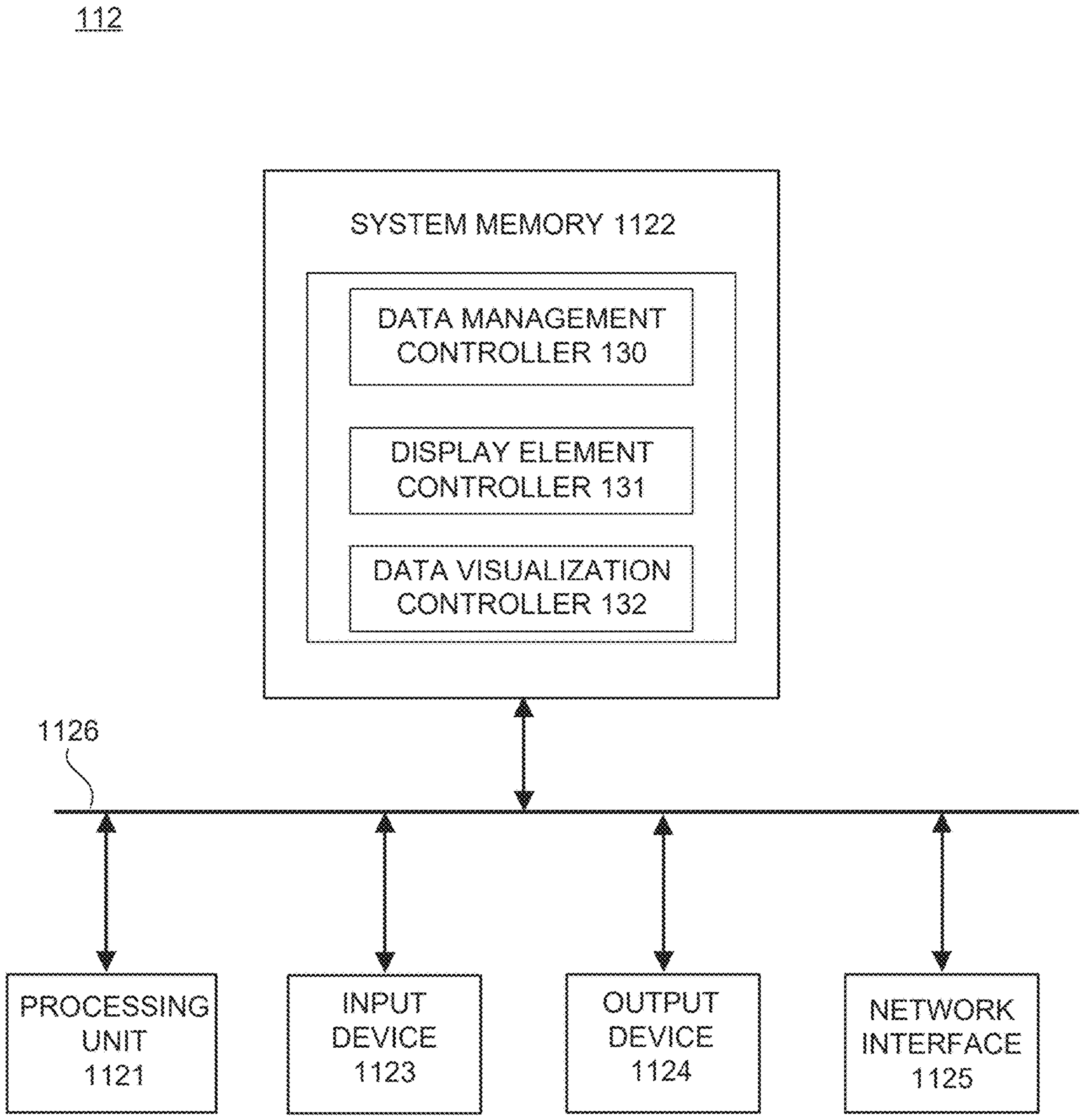
FIG. 5 illustrates an example high level block diagram of the data management server according to one embodiment of the present invention.

FIG. 5 illustrates an example high level block diagram of the data management server 112 according to one embodiment of the present invention. The data management server 112 may be implemented by the computing device 300, and may have a processing unit 1121, a system memory 1122, an input device 1123, an output device 1124, and a network interface 1125, coupled to each other via a system bus 1126. The system memory 1122 may store the data management controller 130, display element controller 131, and data visualization controller 132.

Figure 6:
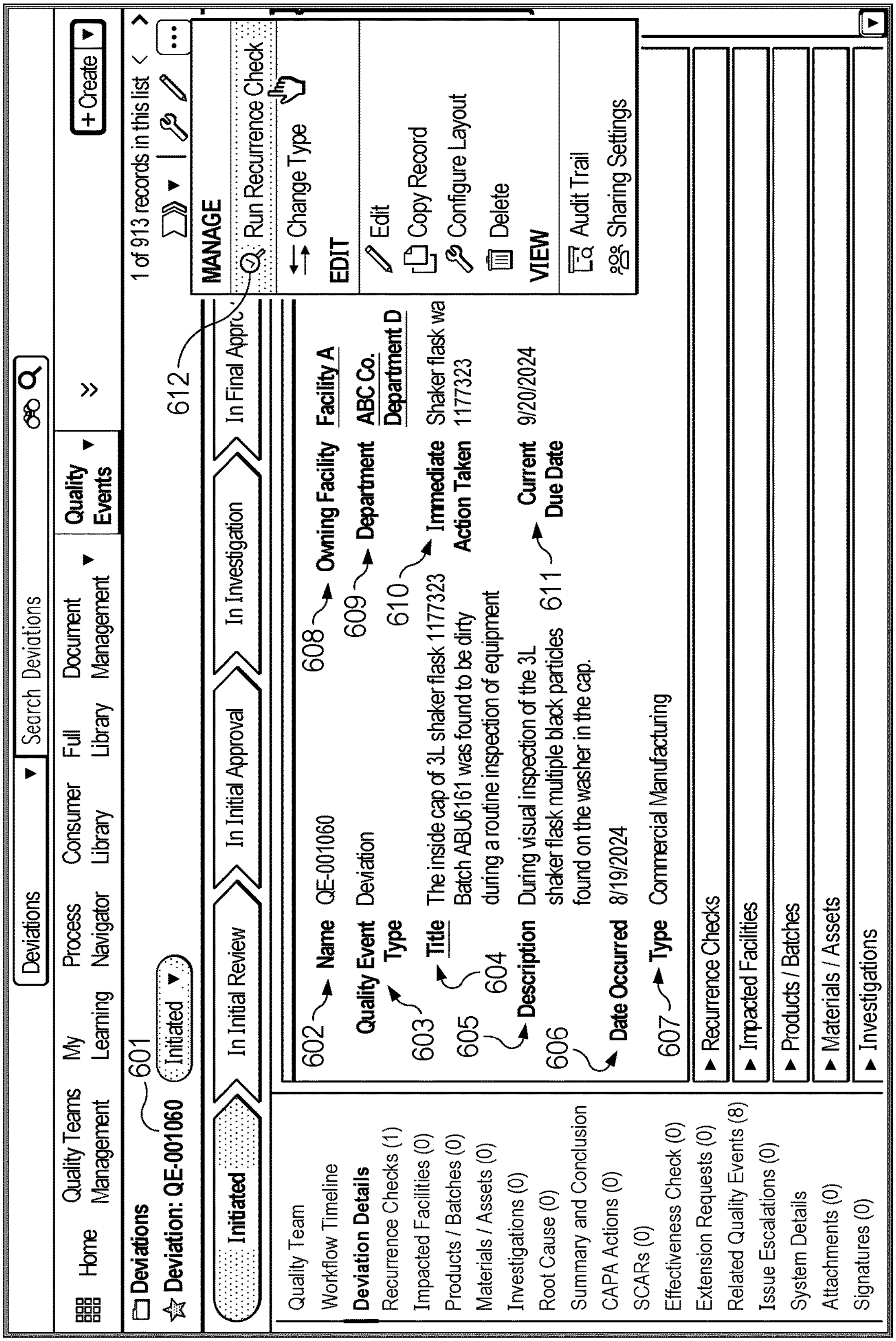
FIG. 6 illustrates an example user interface for database quality recurrence checks and insights execution, processing, management, and evaluation according to one embodiment of the present invention.

Referring to FIG. 6, a deviation data object record from the data and content management system is displayed on a user interface 600. The deviation data object record 601 may store fields such as, but not limited to: Name 602, Quality Event Type 603, Title 604, Description 605, Date Occurred 606, Type 607, Owning Facility 608, Department 609, Immediate Action Taken 610, and Current Due Date 611. The title 604 may provide a concise summary of the deviation. Extracted terms from the title may focus on immediate issues, equipment, or products involved. In contrast, the description 605 field contains detailed, narrative-style information about the event, impact and immediate actions. Extraction from here may yield deeper context, root cause indicators, and process identifiers. A recurrence check identifies whether a given deviation has happened in the past. Previous solutions would require executing a large amount of queries, generating a multitude of reports, then manually analyzing each to draw associations to identify whether a given deviation data object is a recurrence. When “Run Recurrence Check” 609 is selected, the data and content management controller 130 opens a separate overlayed window 700 depicted in FIG. 7. The data and content management controller 130 checks historical data records (e.g., recurrence check data object records) stored in the data repositories 171 to determine whether a prior recurrence check has been completed on this deviation record. The data and content management controller 130 may preserve or supersede the prior results. The data management controller 130 compares a subset of the deviation data object record with associated data stored in the data and content repositories 171 to identify a matching record.

In one implementation, when a recurrence check is executed, the data management controller 130 generates the recurrence check data object capturing metadata related to the execution of the check, but not limited to, the configuration used, filters applied, fields searched, suggested match terms, matching search terms, potential recurrences identified, associated verdict for each potential recurrence identified, associated justification for each potential recurrence identified, associated similarity score for each potential recurrence identified.

In another implementation, an investigation data object record, or a complaint data object record, or any quality data object record may be alternatively used to execute a recurrence check. Duplicate data object records are also checked. The data management controller 130 compares a subset of the alternative quality data object record with associated data stored in the data and content repositories 171 to identify a matching record.

Figure 7:
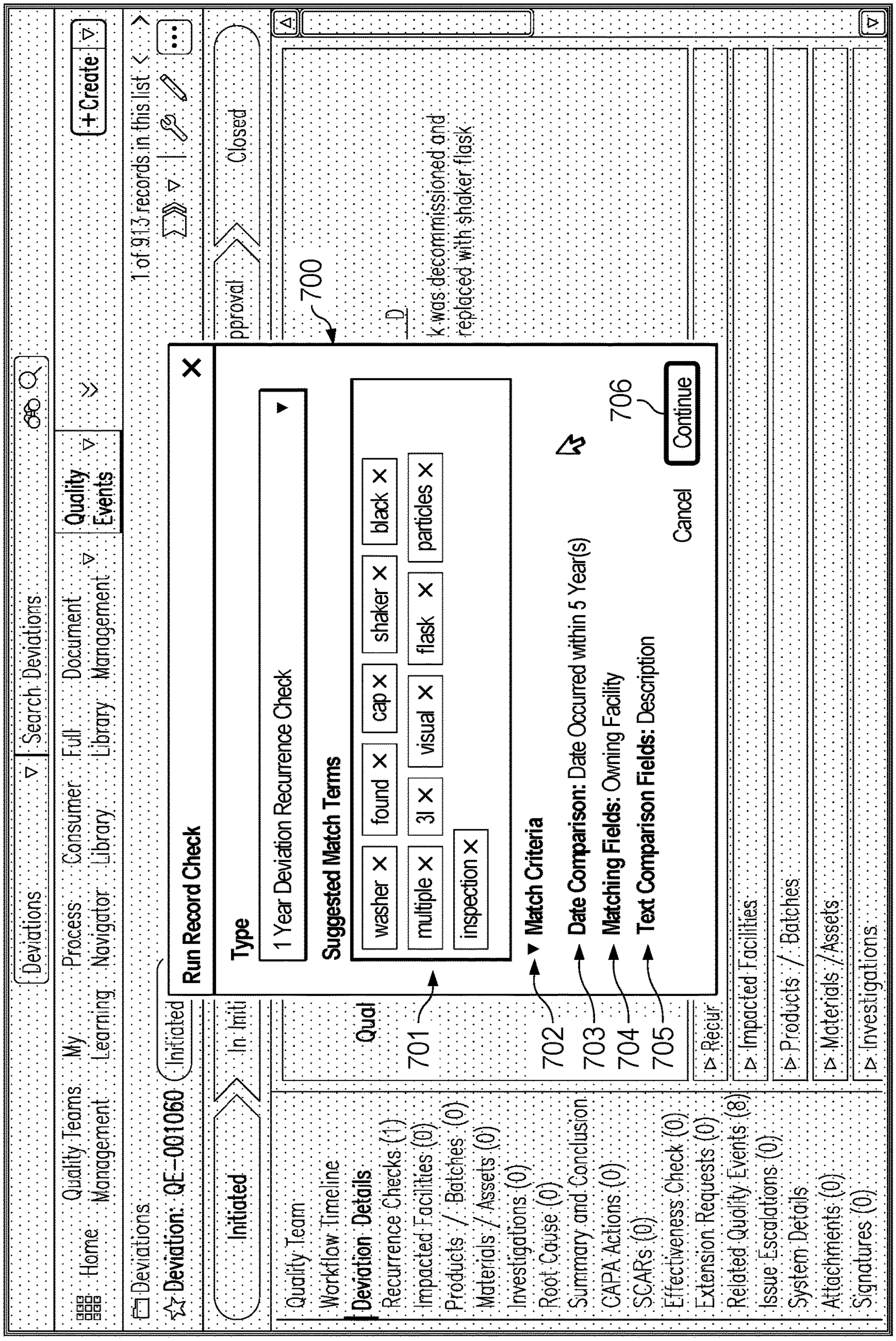
FIG. 7 illustrates another example user interface for database quality recurrence checks and insights execution, processing, management, and evaluation according to one embodiment of the present invention.

Referring to FIG. 7, the data management controller 130 may extract Suggested Match Terms 701 from the unstructured data in the deviation data object record. The Suggested Match Terms may be key words that abstract, summarize, or outline notable aspects in the deviation data object record that facilitate the search for similar potential recurrence data objects. In this example, the data management controller 130 extracted identified search terms from the Title 604 and description 605 from the deviation data object record 601. In another implementation, there is an additional capability to define match criteria 702, such as date comparison 703 (e.g., temporal constraints going back a couple of years), matching fields 704 (e.g., geographical or organizational scope matching such as making sure the facilities match), text comparison fields 705 (e.g., using the description when comparing object records). The match criteria apply limitations or restrictions to the recurrence check. For example, the date comparison may limit the comparison of the deviation data object record 601 with only object records within the past five years. Another example may be only comparing the deviation data object record 601 with object records with matching Owning Facility 608 fields. A further example may be limiting the Suggested Match Terms to be searched for within the description 605 field of object records in the data repositories 171. Selecting the Continue button 706 generates the recurrence check user interface 800 depicted in FIG. 8.

In one implementation, the data management controller 130 may utilize sophisticated Natural Language Processing (NLP) techniques to distill the most relevant semantic information from the text fields of the deviation record. In another implementation, the user may provide additional match terms to the Suggested Match Terms.

In another implementation, the data management controller 130 may utilize various extraction techniques to identify Suggested Match Terms 701. One technique may be Term Frequency Inverse Document Frequency, or Rapid Automatic Keyword Extraction to identify statistically important words or phrases. Another technique may involve identifying specific entities such as equipment IDs, product names, facility locations, and personnel using Named Entity Recognition (NER). Yet another technique may involve semantic embedding, where text is converted into a vector representation to allow for semantic similarity search and moving beyond exact keyword matches.

Figure 8:
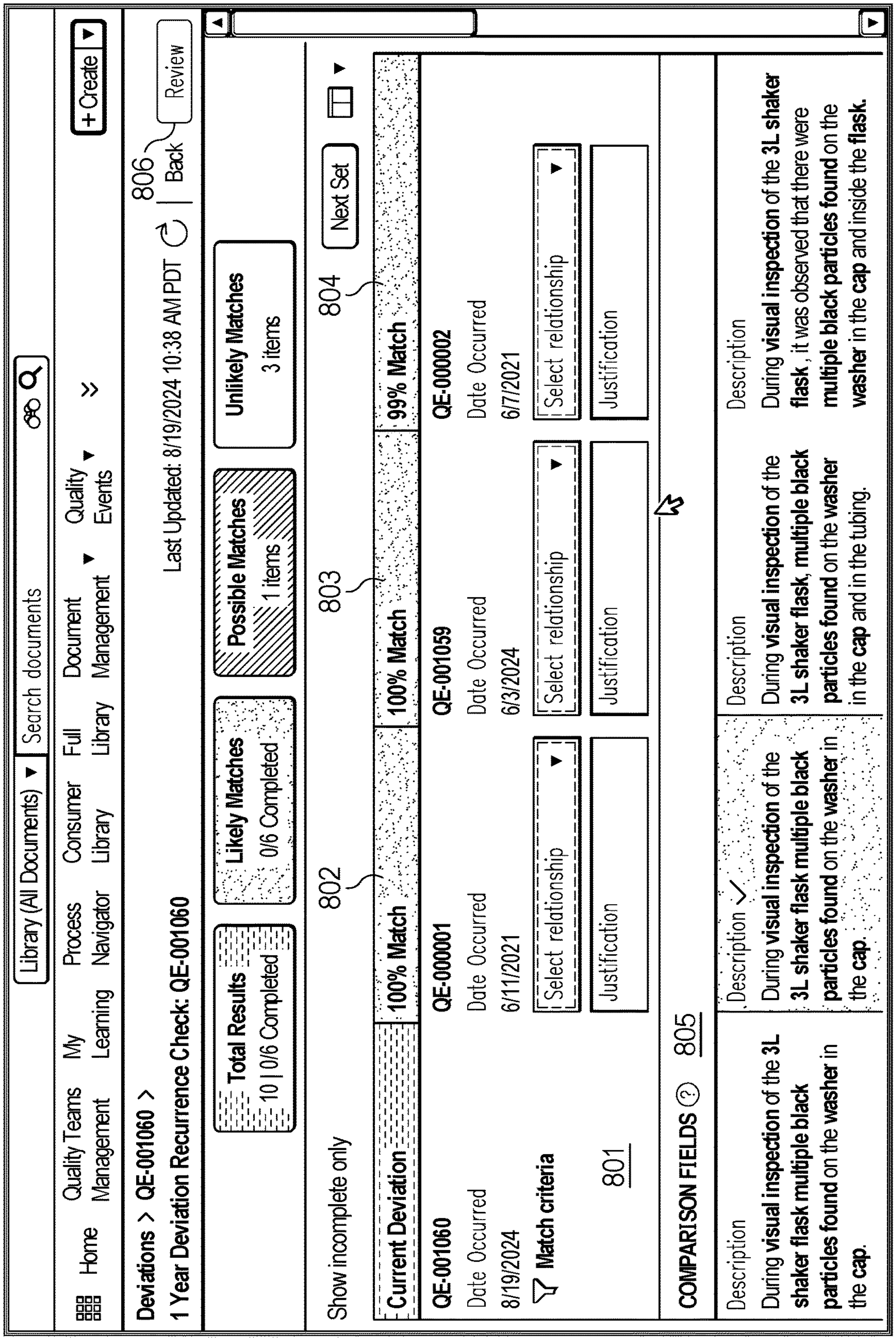
FIG. 8 illustrates another example user interface for database quality recurrence checks and insights execution, processing, management, and evaluation according to one embodiment of the present invention.

Referring now to FIG. 8, the data management controller 130 identifies recurrences associated with a given deviation data object record 801 in the data and content repositories 171 that match the given search criteria defined in FIG. 7. The data management controller 130 identifies potential recurrence data object records (802, 803, 804) in the data and content repositories 171 that contain the Suggested Match Terms 701 while satisfying the match criteria 702. The data management controller 130 also generates a match score for each potential recurrence data object record. In one implementation, the match score may use NLP to generate a numerical quantification of the semantic or lexical similarity between the deviation data object record 601 and each identified potential recurrence data object record. Various scoring algorithms may be used such as Jaccard Similarity to calculate the overlap of the remaining unique terms, Cosine Similarity, or Euclidean distance.

In another implementation, the similarity score may leverage natural language processing, context and sentiment to calculate similarity scores more accurately.

As shown, recurrence check user interface 800 may also display a listing of comparison fields 805 (e.g., description), display fields (e.g., investigation summary and conclusion, impact and risk analysis, department), and filter fields. The comparison fields may be the data object fields used to identify the potential recurrence data object records. In this example, the description field is shown for the given deviation data object record 801 and each potential recurrence data object record (802, 803, 804). Any matched term may be displayed in bold.

The drop down list can include "is a recurrence of" or "is unrelated" and a justification for whether the potential recurrence data object record is a recurrence or is unrelated. Each result may be further refined to indicate the recurrence relevancy.

There may also be tiers designating the likelihood of match for potential recurrence data object records based on the match score. These tiers can be configurable by the user or preconfigured based on user preferences. For example, anything over 75% is a likely match, 50-74.99% is possible matches, and anything less than 50% is an unlikely match. These tiers can be tailored to customer preferences. When the Review button 806 is selected, the recurrence check review user interface 900 depicted in FIG. 9 is opened.

Figure 9:
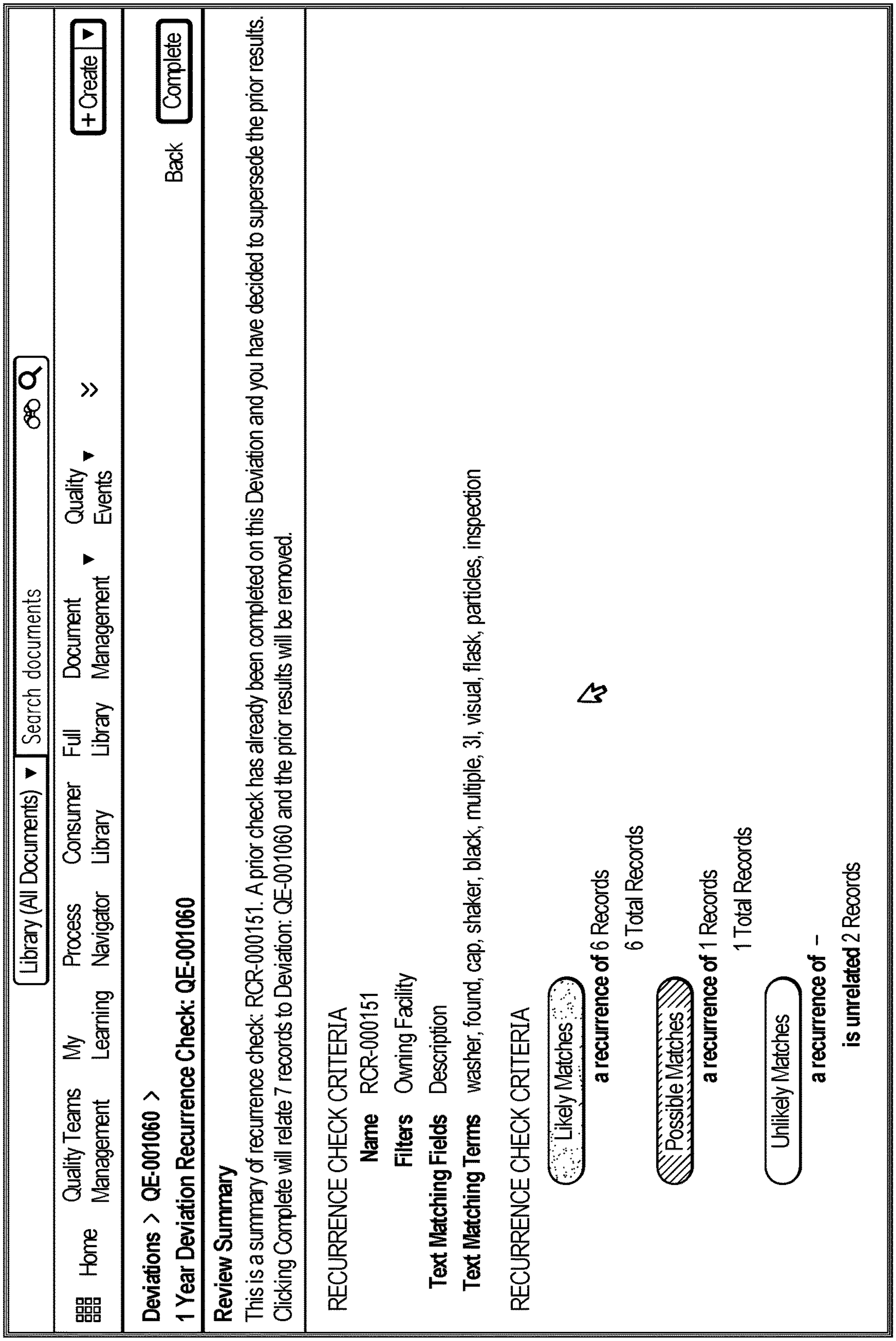
FIG. 9 illustrates another example user interface for database quality recurrence checks and insights execution, processing, management, and evaluation according to one embodiment of the present invention.
Figure 10:
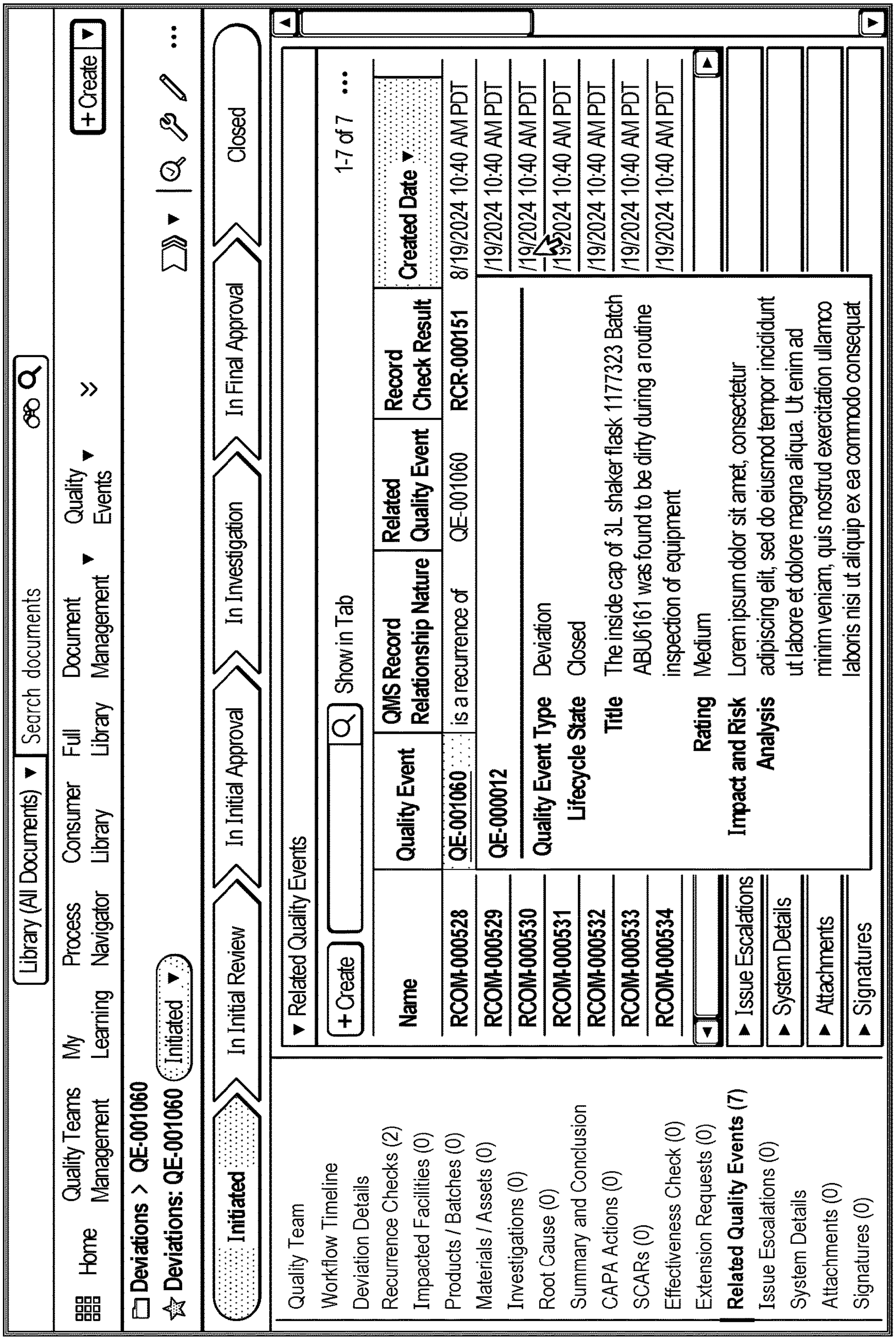
FIG. 10 illustrates another example user interface for database quality recurrence checks and insights execution, processing, management, and evaluation according to one embodiment of the present invention.

Referring now to FIG. 9, a summary of the recurrence check is provided. The filters, text matching fields (e.g., the fields used for comparison or finding matching terms), text matching terms, are shown. The breakdown of the likely matches, possible matches, and unlikely matches are provided. When complete is clicked, the data management controller 130 associates each of the potentially recurrence data objects identified as likely matches to the deviation record object as depicted in FIG. 10.

Figure 11:
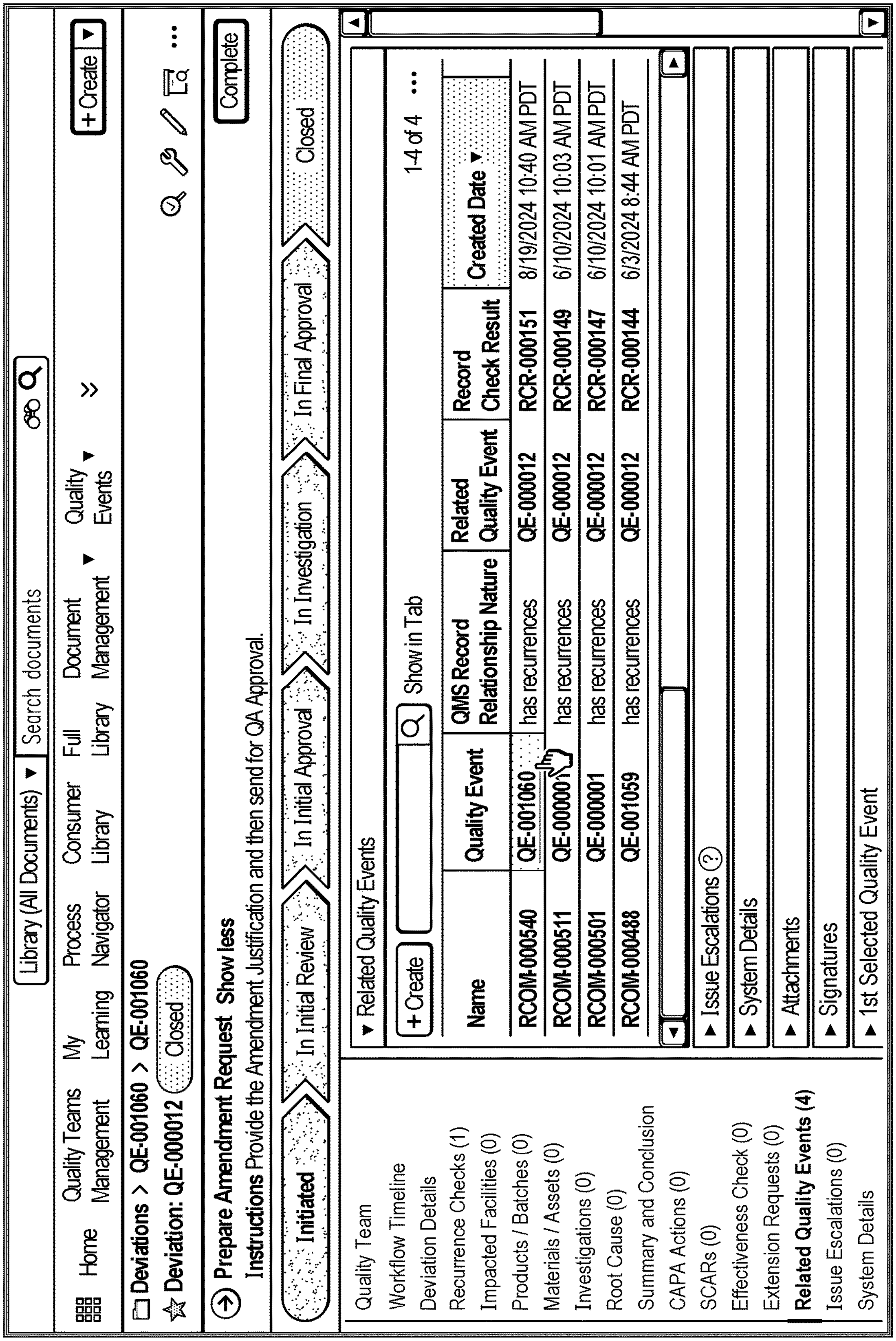
FIG. 11 illustrates another example user interface for database quality recurrence checks and insights execution, processing, management, and evaluation according to one embodiment of the present invention.

Similarly, the data management controller 130 also links object records for the inverse relationship for consistency. As seen in FIG. 11, QU-001060 has recurrences with related quality event QE-000012.

Investigations are costly to execute and can lengthen the overall cycle time for a record. Common root cases and field values on recurring records are not easy to summarize. Recurrence check insights automatically capture key information and surfaces information to the end user. User's can easily consume the insights and enable them to make data driven decisions on how to best to proceed.

Figure 12:
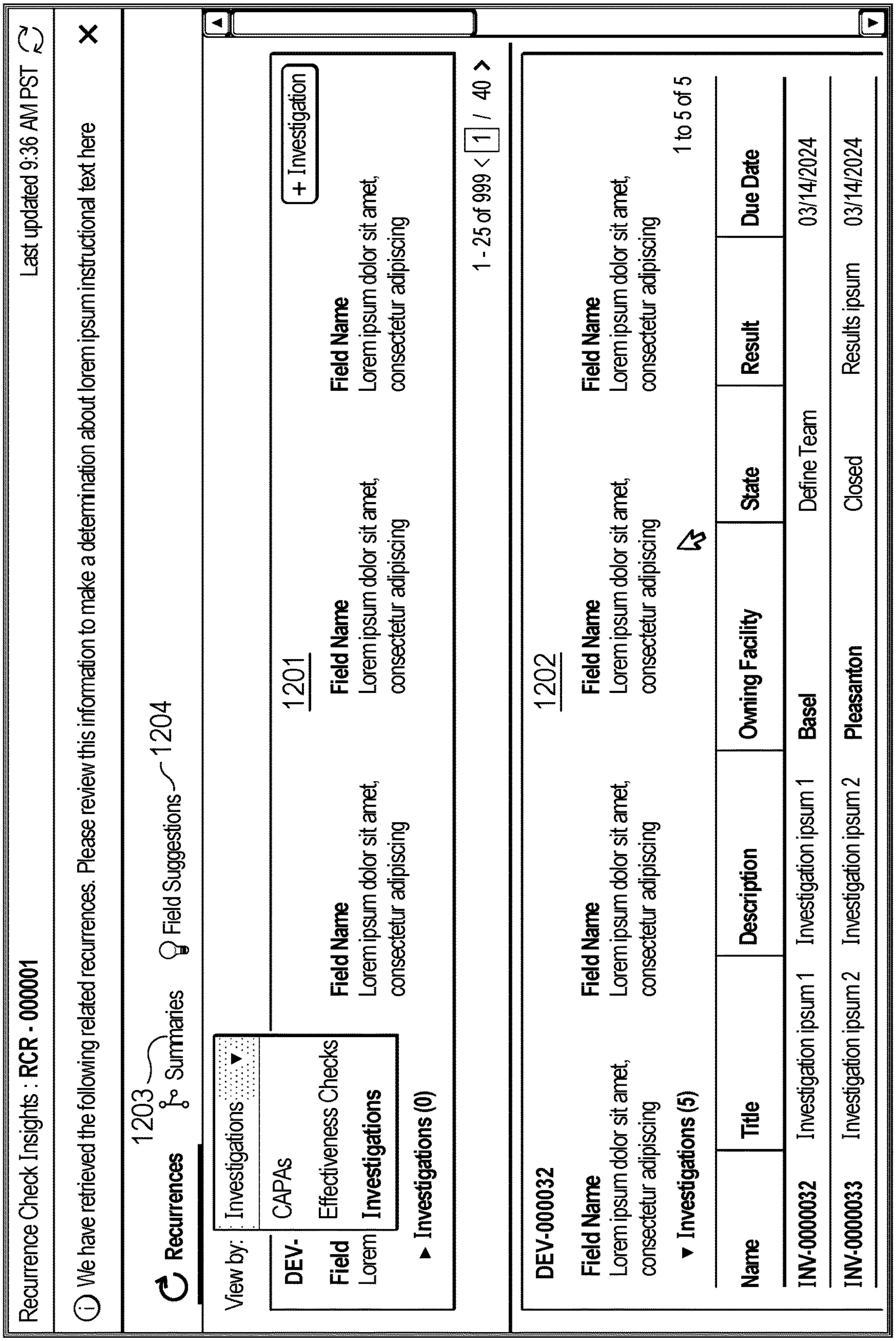
FIG. 12 illustrates another example user interface for database quality recurrence checks and insights execution, processing, management, and evaluation according to one embodiment of the present invention.

Referring now to FIG. 12, for a given source deviation data object record 1201, there is a listing provided in 1202 of recurrence data object records identified. For each recurrence, there is a listing of the investigations performed and/or in progress. The correction and preventive actions can be easily ascertained as well as the effectiveness of each corrective and preventive action.

Figure 13:
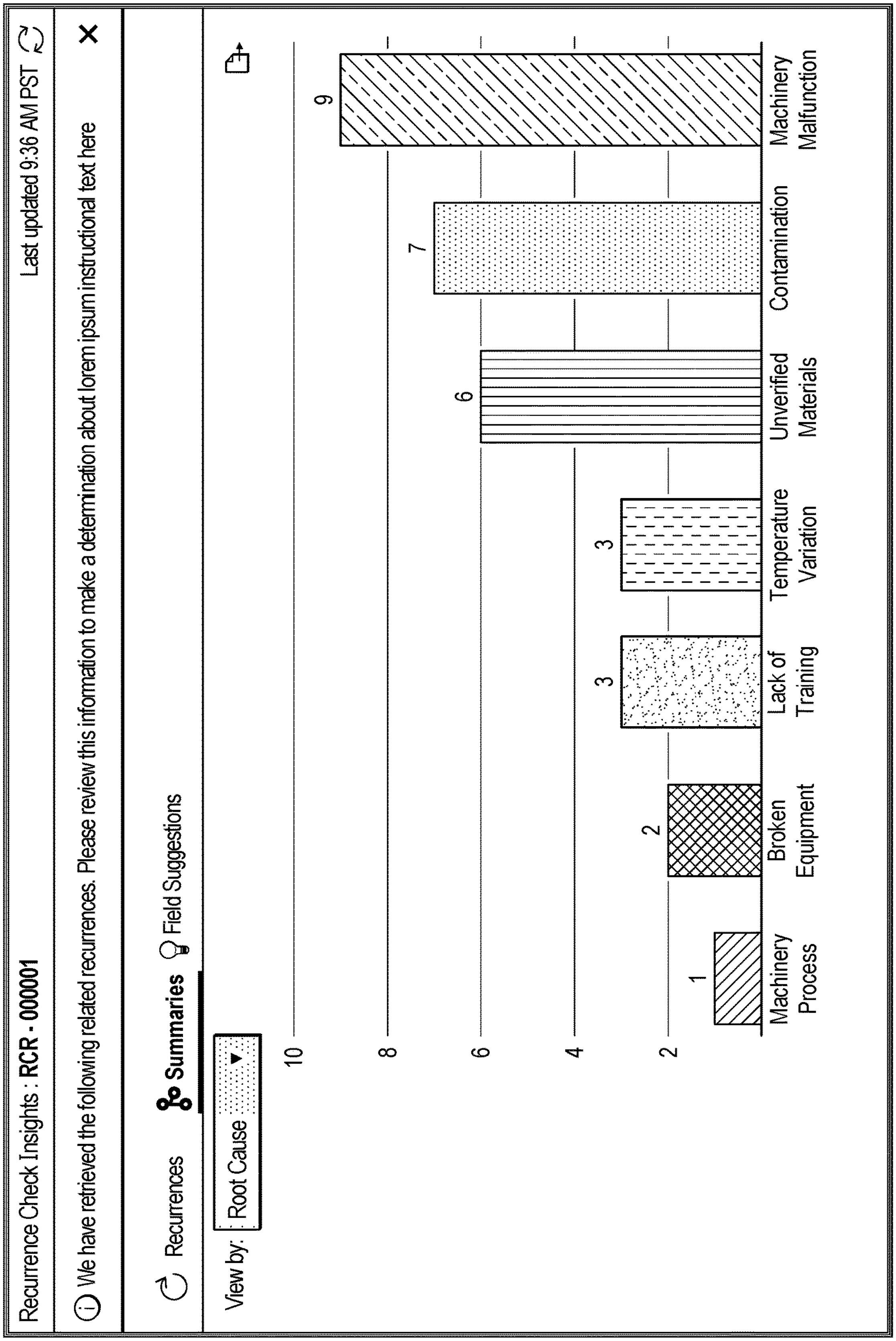
FIG. 13 illustrates another example user interface for database quality recurrence checks and insights execution, processing, management, and evaluation according to one embodiment of the present invention.

Selecting the Summaries tab 1203 opens the summary user interface 1300 shown in FIG. 13. A breakdown of the root causes may be displayed in an easily digestible form such as a chart, or graph. In one implementation, recurrence check records may be used by the data visualization controller to generate custom reports.

Figure 14:
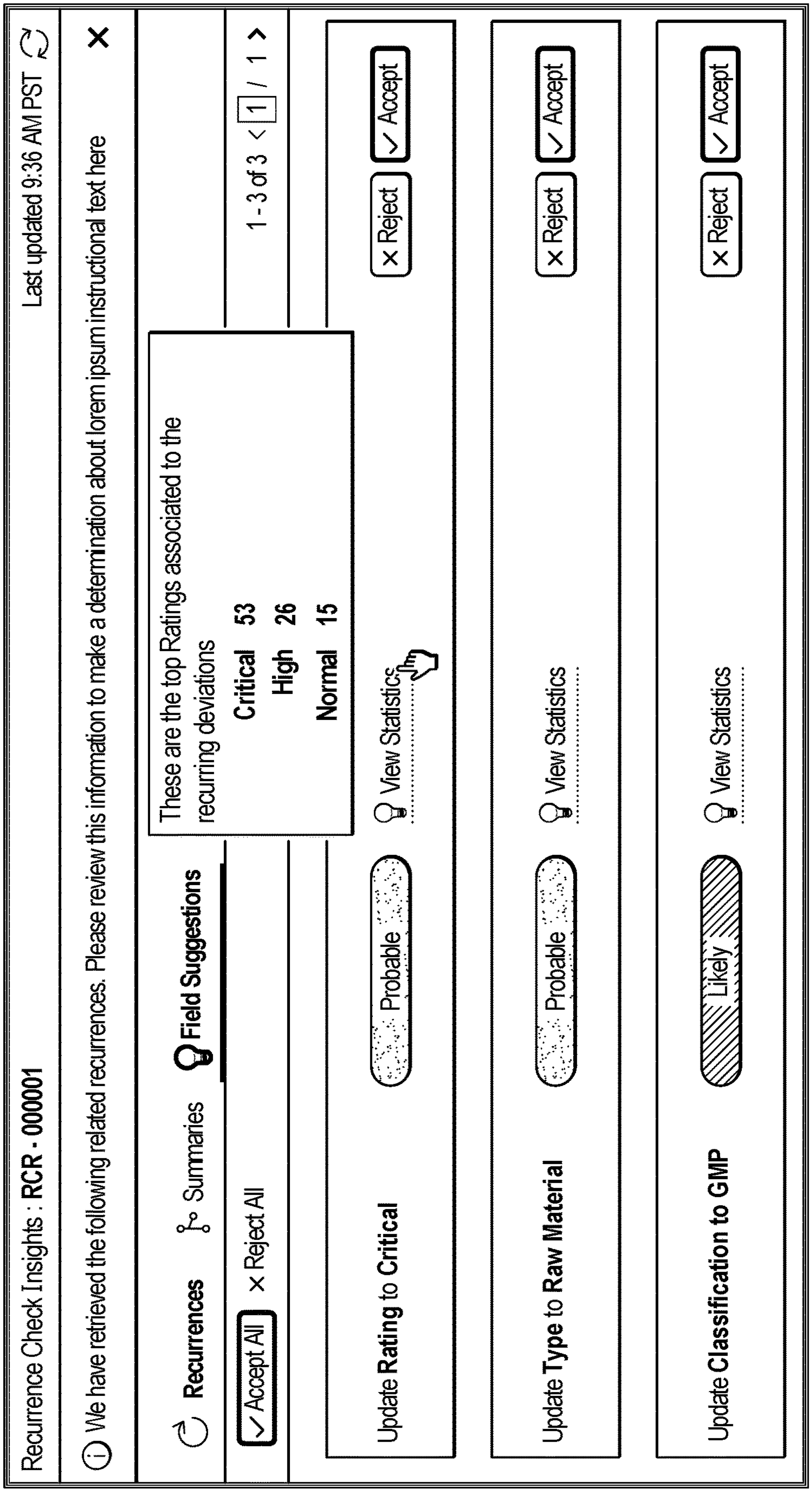
FIG. 14 illustrates another example user interface for database quality recurrence checks and insights execution, processing, management, and evaluation according to one embodiment of the present invention.

Selecting the Field Suggestions tab 1204 opens the user interface 1400 depicted in FIG. 14. Suggested fields that need to be updated based on the current values of the recurrences are highlighted. Statistics are also provided to display the breakdown of each of those values. When the Accept button is clicked, then the data management controller 130 may update the field values for those listed.

The above description was described in context with the investigations process. In another embodiment, the disclosure can be used further in front in the quality workflow lifecycle. The above described process may be used to speed up the triage process for quality events. The data management controller 130 may suggest field values and reference data associated to a deviation when it is entered into the data management system. This speeds up the triage process of a deviation or complaint. Similarly, suggestions may be provided for complaint codes or adverse event codes.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly per form their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for quality recurrence check in a database management system, the computer-implemented method comprising:

identifying, by one or more processors of the database management system, a quality data object record;

establishing, by the one or more processors, a set of match criteria including a temporal constraint, matching field limiter, and text comparison fields restriction;

extracting, by the one or more processors, utilizing Natural Language Processing (NLP) techniques, a set of suggested match terms from unstructured text fields in the quality data object record that outline aspects of the quality data object record to be matched;

comparing, by the one or more processors, the set of suggested match terms with data object records in the database management system satisfying the set of match criteria to identify potential recurrence data objects associated with the quality data object record;

generating, by the one or more processors, a match score for each data object record and quality data object record comparison;

evaluating, by the one or more processors, a bracket ranking for each match score to identify a likelihood of match corresponding to each of the identified potential recurrence data objects;

associating, by the one or more processors, each identified potential recurrence data object with the quality data object record with a match score above a first threshold;

creating, by the one or more processors, a bidirectional link by associating the quality data object record with each identified potential recurrence data object with a match score above the first threshold; and generating, by the one or more processors, a recurrence check data object in the database management system, the recurrence check data object capturing metadata related to execution of the quality recurrence check including the set of match criteria, the set of suggested match terms the potential recurrence data objects identified, a verdict for each potential recurrence data object identified, and the match score for each potential recurrence data object identified.

2. The computer-implemented method of claim 1, wherein the quality data object record is a deviation, complaint, or investigation data object record.

3. A data management system for quality recurrence check, the data management system comprising:

one or more repositories;

a network interface configured to facilitate data communication via a network; and a processing circuit comprising one or more processors and a memory, the processing circuit configured to:

identify, by the one or more processors, a quality data object record;

establish, by the one or more processors, a set of match criteria including a temporal constraint, matching field limiter, and text comparison fields restriction;

extract, by the one or more processors, utilizing Natural Language Processing (NLP) techniques, a set of suggested match terms from unstructured text fields in the quality data object record that outline aspects of the quality data object record to be matched;

compare, by the one or more processors, the set of suggested match terms with data object records in the database management system satisfying the set of match criteria to identify potential recurrence data objects associated with the quality data object record;

generate, by the one or more processors, a match score for each data object record and quality data object record comparison;

evaluate, by the one or more processors, a bracket ranking for each match score to identify a likelihood of match corresponding to each of the identified potential recurrence data objects;

associate, by the one or more processors, each identified potential recurrence data object with the quality data object record with a match score above a first threshold;

create, by the one or more processors, a bidirectional link by associating the quality data object record with each identified potential recurrence data object with a match score above the first threshold; and generate, by the one or more processors, a recurrence check data object in the database management system, the recurrence check data object capturing metadata related to execution of the quality recurrence check including the set of match criteria, the set of suggested match terms, the potential recurrence data objects identified, a verdict for each potential recurrence data object identified, and the match score for each potential recurrence data object identified.

4. The system of claim 3, wherein the quality data object record is a deviation, complaint, or investigation data object record.

5. A non-transitory computer readable medium including instructions that, when executed by one or more processors, cause the one or more processors to perform the steps of:

identifying, by the one or more processors, a quality data object record;

establishing, by the one or more processors, a set of match criteria including a temporal constraint, matching field limiter, and text comparison fields restriction;

extracting, by the one or more processors, utilizing Natural Language Processing (NLP) techniques, a set of suggested match terms from unstructured text fields in the quality data object record that outline aspects of the quality data object record to be matched;

comparing, by the one or more processors, the set of suggested match terms with data object records in a database management system satisfying the set of match criteria to identify potential recurrence data objects associated with the quality data object record;

generating, by the one or more processors, a match score for each data object record and quality data object record comparison;

evaluating, by the one or more processors, a bracket ranking for each match score to identify a likelihood of match corresponding to each of the identified potential recurrence data objects;

associating, by the one or more processors, each identified potential recurrence data object with the quality data object record with a match score above a first threshold;

creating, by the one or more processors, a bidirectional link by associating the quality data object record with each identified potential recurrence data object with a match score above the first threshold; and generating, by the one or more processors, a recurrence check data object in the database management system, the recurrence check data object capturing metadata related to execution of the quality recurrence check including the set of match criteria, the set of suggested match terms, the potential recurrence data objects identified, a verdict for each potential recurrence data object identified, and the match score for each potential recurrence data object identified.

6. The non-transitory computer readable medium of claim 5, wherein the quality data object record is a deviation, complaint, or investigation data object record.

7. The computer-implemented method of claim 1, wherein the recurrence check data object further captures a justification for each verdict and matching search terms used to identify each potential recurrence data object.

8. The computer-implemented method of claim 1, wherein the bracket ranking comprises configurable tiers designating the likelihood of match, the configurable tiers including a likely match tier for match scores above a first percentage threshold, a possible match tier for match scores within a second percentage range, and an unlikely match tier for match scores below the second percentage range.

9. The system of claim 3, wherein the recurrence check data object further captures a justification for each verdict and matching search terms used to identify each potential recurrence data object.

10. The system of claim 3, wherein the bracket ranking comprises configurable tiers designating the likelihood of match, the configurable tiers including a likely match tier for match scores above a first percentage threshold, a possible match tier for match scores within a second percentage range, and an unlikely match tier for match scores below the second percentage range.

11. The non-transitory computer readable medium of claim 5, wherein the recurrence check data object further captures a justification for each verdict and matching search terms used to identify each potential recurrence data object.

12. The non-transitory computer readable medium of claim 5, wherein the bracket ranking comprises configurable tiers designating the likelihood of match, the configurable tiers including a likely match tier for match scores above a first percentage threshold, a possible match tier for match scores within a second percentage range, and an unlikely match tier for match scores below the second percentage range.

13. The computer-implemented method of claim 1, further comprising rendering, by the one or more processors, on a recurrence check user interface, comparison fields for the quality data object record and each identified potential recurrence data object, wherein matched terms within the comparison fields are displayed in bold.

14. The computer-implemented method of claim 1, further comprising:

identifying, by the one or more processors, suggested field value updates for the quality data object record based on current field values of the identified potential recurrence data objects; and responsive to receiving an acceptance input, updating, by the one or more processors, the field values of the quality data object record based on the suggested field value updates.

15. The system of claim 3, wherein the processing circuit is further configured to render, on a recurrence check user interface, comparison fields for the quality data object record and each identified potential recurrence data object, wherein matched terms within the comparison fields are displayed in bold.

16. The system of claim 3, wherein the processing circuit is further configured to:

identify suggested field value updates for the quality data object record based on current field values of the identified potential recurrence data objects; and responsive to receiving an acceptance input, update the field values of the quality data object record based on the suggested field value updates.

17. The non-transitory computer readable medium of claim 5, wherein the instructions further cause the one or more processors to render, on a recurrence check user interface, comparison fields for the quality data object record and each identified potential recurrence data object, wherein matched terms within the comparison fields are displayed in bold.

18. The non-transitory computer readable medium of claim 5, wherein the instructions further cause the one or more processors to:

identify suggested field value updates for the quality data object record based on current field values of the identified potential recurrence data objects; and responsive to receiving an acceptance input, update the field values of the quality data object record based on the suggested field value updates.

* * * * *